(12) United States Patent
Tokumoto (10) Patent No.: US 8,743,418 B2
(45) Date of Patent: Jun. 3, 2014

(54) METHOD FOR REMOVING CHARACTER-OBJECT OVERLAP TO INCREASE RENDER PROCESSING SPEED FOR AN IMAGE

(75) Inventor: Hirokazu Tokumoto, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 62 days.

(21) Appl. No.: 13/486,626

(22) Filed: Jun. 1, 2012

(65) Prior Publication Data
US 2012/0327431 A1 Dec. 27, 2012

(30) Foreign Application Priority Data
Jun. 21, 2011 (JP) .................. 2011-137739

(51) Int. Cl.
*G06K 15/02* (2006.01)
(52) U.S. Cl.
USPC ........................................ 358/1.2

(58) Field of Classification Search
USPC ........................................ 358/1.2
See application file for complete search history.

(56) References Cited

U.S. PATENT DOCUMENTS

2007/0053584 A1* 3/2007 Nagaoka et al. .............. 382/154
2011/0109642 A1* 5/2011 Chang et al. .................. 345/589

FOREIGN PATENT DOCUMENTS

| JP | 10-177657 A | 6/1998 |
| JP | 2011-002977 A | 1/2011 |

* cited by examiner

*Primary Examiner* — Eric A Rust
(74) *Attorney, Agent, or Firm* — Fitzpatrick, Cella, Harper & Scinto (57) ABSTRACT

In an image processing apparatus for subjecting objects to rendering processing, it is determined whether edges overlap at the same starting position where the objects are overlaid. If it is determined that the edges overlap, then the overlapping edges are eliminated.

9 Claims, 10 Drawing Sheets

| EDGE LIST Y=200 | | | | | | |
|---|---|---|---|---|---|---|
| SEGMENT | X=20<br>dx=0<br>dy=20 | X=20<br>dx=0<br>dy=20 | X=20<br>dx=0<br>dy=20 | X=40<br>dx=0<br>dy=20 | X=40<br>dx=0<br>dy=20 | X=60<br>dx=0<br>dy=20 |
| LEVEL | Lv=3<br>COPY PEN | Lv=2<br>COPY PEN | Lv=1<br>COPY PEN | Lv=3<br>COPY PEN | Lv=1<br>COPY PEN | Lv=2<br>COPY PEN |
| FILL | (125,125,125) | (125,125,125) | (125,125,125) | (125,125,125) | (125,125,125) | (125,125,125) |
| NUMBER | 6 | 4 | 2 | 5 | 1 | 3 |

DISPLAY LIST

METHOD FOR REMOVING CHARACTER-OBJECT OVERLAP TO INCREASE RENDER PROCESSING SPEED FOR AN IMAGE

BACKGROUND OF THE INVENTION

1. Field of the Invention

The present invention relates to an image processing apparatus and method for directly receiving an electronic document and subjecting the document to image processing.

2. Description of the Related Art

Owing to the diversification of application software and operating systems in recent years, print rendering instructions have become more complex and this has placed an increasing load on printing devices for the purpose of rendering and image processing. A rendering method based upon scan line rendering is in use in order to process complex rendering instructions and high speed.

Scan line rendering is a technique for extracting the outlines of objects, removing edge overlap between objects and applying sort processing to edge columns from which overlap has been eliminated (see Japanese Patent Laid-Open No. 10-177657).

In case of data in which rendered objects are overlapping at the same location or data in which rendered objects have been rendered densely with respect to nearby areas, a heavy load is imposed upon sort processing and processing takes a very long time. A technique that removes character-object overlap has been proposed as a measure for dealing with overlapping objects (see Japanese Patent Laid-Open No. 2011-002977).

With this technique for removing overlap character-object overlap, if character data has been rendered successively, the solution involves sensing edge overlap during rendering and deleting unnecessary data of lower order.

However, since an object such as a graphic or line is composed of one object and a combination of two or more edges, deletion is difficult. Further, in a case where graphic objects are overlapping, judgments cannot be made based upon only one edge and it is necessary to perform determination and deletion for every combination of edges. Such determination and deletion is difficult.

SUMMARY OF THE INVENTION

The present invention provides an apparatus and method capable of deleting edges that overlap at the same starting position at which objects are superimposed and rendered, and of executing object rendering processing at high speed.

According to one aspect of the present invention, there is provided an image processing apparatus for subjecting objects to rendering processing, comprising: a determination unit configured to determine whether edges overlap in excess of a threshold value at the same starting position where the objects are overlaid; and a deletion unit configured to delete, in a case where the determination unit has determined that the edges overlap, these overlapping edges.

Further features of the present invention will become apparent from the following description of exemplary embodiments (with reference to the attached drawings).

BRIEF DESCRIPTION OF THE DRAWINGS

FIG. 4A is a diagram illustrating overlaid objects and 4B a diagram illustrating intermediate data of the overlaid objects;

DESCRIPTION OF THE EMBODIMENTS

Embodiments for practicing the present invention will now be described in detail with reference to the drawings. In the embodiments, the invention is described taking a digital multifunction peripheral (MFP) such as an image forming apparatus as an example. However, it goes without saying that the present invention may also be applied to a single-function printer (SFP), laser-beam printer (LBP) and printers using other types of printing methods.

<Printing System Overview>

Figure 1:
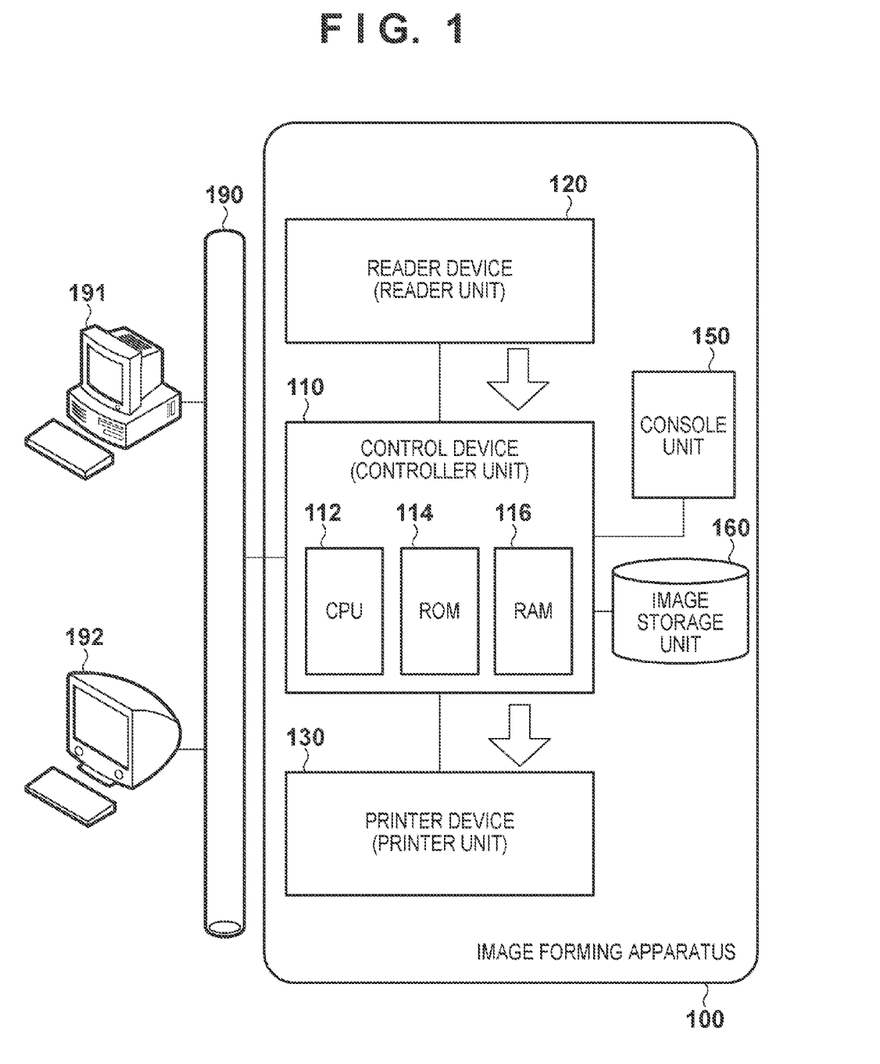
FIG. 1 is a diagram illustrating the configuration of a printing system that includes an image forming apparatus.

First, reference will be had to FIG. 1 to describe the configuration of a printing system that includes an image forming apparatus equipped with a controller as an electronic part according to the present invention. As shown in FIG. 1, an image forming apparatus 100 is connected to host computers (a first host computer 191 and a second host computer 192) via a local-area network (LAN) 190. Although the connection is via the LAN 190, the connection may be made via a communication network such as the Internet.

The image forming apparatus 100 is constituted by a reader device (reader unit) 120, a printer device (printer unit) 130, a console unit 150, an image storage unit 160 and a control device (controller unit) 110 for controlling these structural elements. The control device 110 includes a CPU 112, a ROM 114 and a RAM 116, etc. The CPU 112 exercises overall control of the image forming apparatus 100 in accordance with a program that has been stored in the ROM 114 or on another storage medium. The RAM 116 is used as work area when the CPU 112 executes processing.

The reader device 120 reads image data. The printer device 130, on the other hand, outputs image data using a printer engine. The console unit 150 has a keyboard used by an operator to input and output image data, and a liquid crystal panel for displaying/setting image data and various functions. Electronic documents and data such as image data are stored temporarily or archived in the image storage unit 160.

The host computer 191 transmits an electronic document to the image forming apparatus 100 via the LAN 190. The CPU 112 of the control device 110 in the image forming apparatus 100 interprets the received electronic document and executes processing for generating output image data, and the printer device 130 produces an output on a printing medium such as paper. Although an example in which an electronic document is input via the LAN 190 is described here, an electronic document that has been stored on transportable media, such as a USB memory connected to the image forming apparatus 100, or in the image storage unit 160 may be input.

Figure 2:
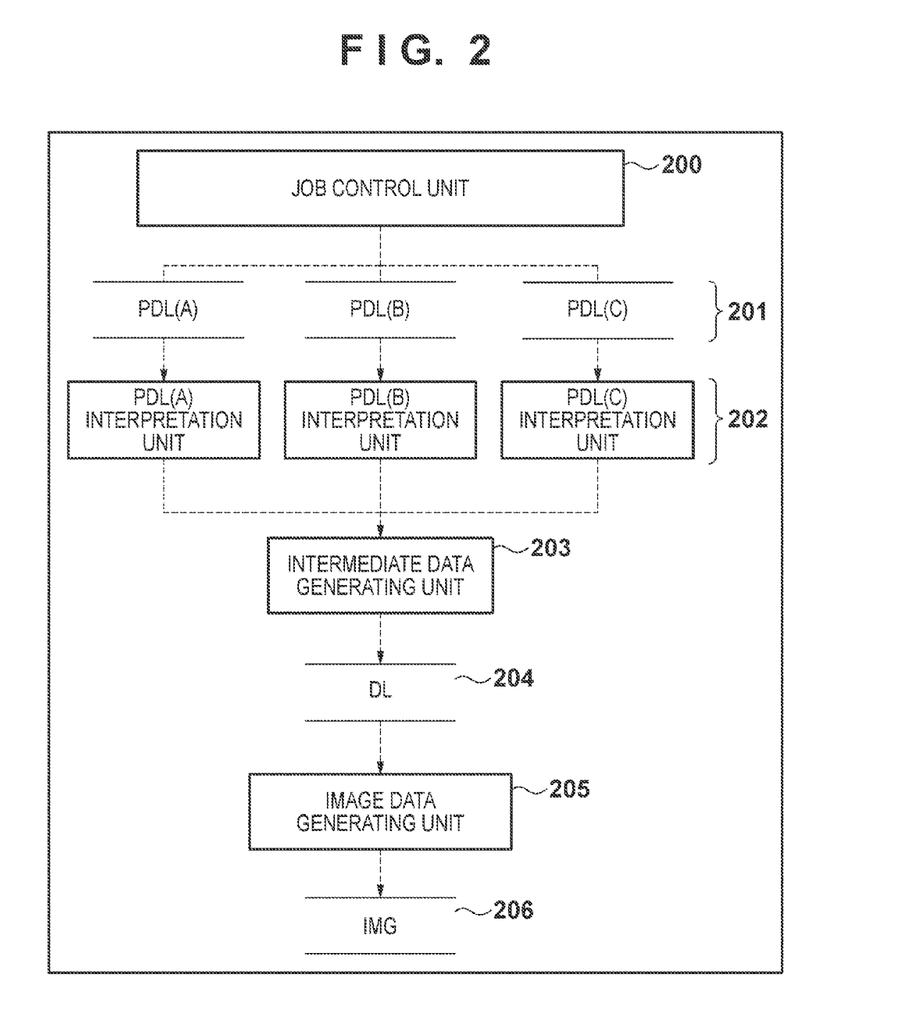
FIG. 2 is a diagram illustrating an example of the constitution of software of the image forming apparatus.

Next, reference will be had to FIG. 2 to describe an example of the constitution of software run by the control device 110 of image forming apparatus 100. A job control unit 200 executes and controls input and output of a print job by function call and message communication, etc. A number of types (PostScript, PCL, XPS, etc.) of page description language (PDL) exist in the image forming apparatus 100. In accordance with control by the job control unit 200, a PDL interpretation unit 202 reads in PDL data that has been stored in a PDL receiving buffer 201 and executes interpretation processing for interpreting the PDL data.

In accordance with control by the job control unit 200 and rendering information delivered from the PDL interpretation unit 202, an intermediate data generating unit 203 generates a display list (DL), which is intermediate data, and stores it in a frame buffer 204. An image data generating unit 205 executes processing for loading the DL from the frame buffer 204 and outputting image data 206, which is the result of rendering based upon the DL.

[First Embodiment]

Figure 3A:
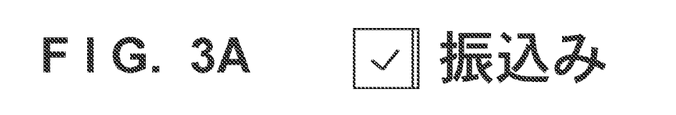
FIG. 3A is a diagram illustrating optimum result of printing of target data, FIG. 3B a diagram illustrating an example of an overlapped rendering pattern 1 and FIG. 3C a diagram illustrating an example of an overlapped rendering pattern 2.

A method of eliminating combined edges in a first embodiment will be described. FIG. 3A is a diagram illustrating optimum result of printing of target data. In this example, the result of printing is composed of a check box, which is constituted by graphic and line attributes, and the characters "振込み" (the three characters "振", "込" and "み"). Although it cannot be ascertained from the results of printing, these objects are the result of overlapping and rendering a large quantity of objects at the same location.

When thus overlapping and rendering objects at the same location, a large amount of edge data is placed at the same location in a case where the image data generating unit 205 is a scan-line rendering model. As a consequence, processing such as sorting takes a very long time. Processing for eliminating overlapping edges in order to solve this problem will now be described.

Figure 3B:
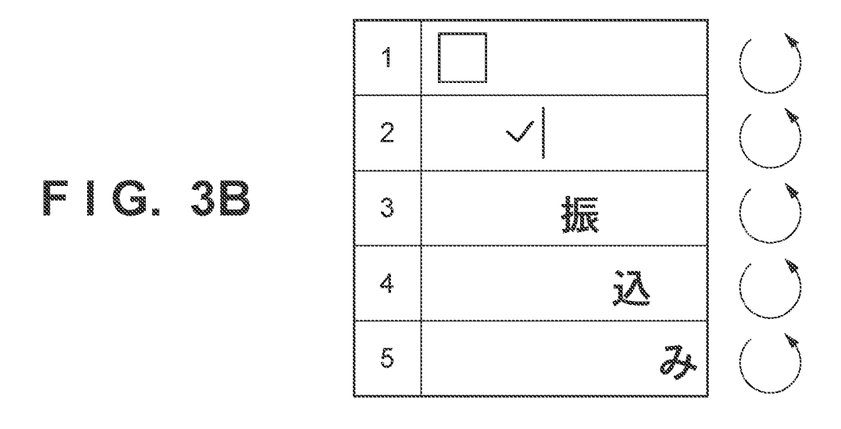
Figure 3C:
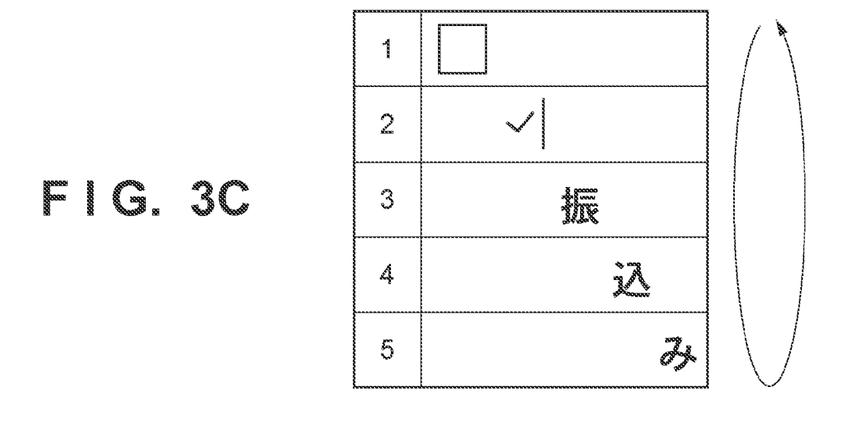

FIG. 3B is an example of a pattern in the order in which the target data shown in FIG. 3A is overlapped and rendered. In this case, rendering instructions are issued successively and repeatedly for each of single objects. Similarly, FIG. 3C also is an example of a pattern in the order in which the target data shown in FIG. 3A is superimposed and rendered. In this case, a rendering instruction is issued repeatedly with periodicity for objects in order from 1 to 5.

In other words, in the case of the pattern shown in FIG. 3B, identical render instructions are successive. Therefore, by simply making a comparison with the preceding rendering instruction, the sensing of overlapping objects is comparatively easy in contrast with the pattern shown in FIG. 3C. In the case of the pattern shown in FIG. 3C, rendering instructions are not successive; the same rendering instruction is issued with a certain degree of periodicity. Consequently, the sensing of overlapping objects is difficult in contrast with FIG. 3B and elimination thereof also cannot be achieved.

In the case of such a rendering instruction, overlapping objects cannot be sensed by the PDL interpretation unit 202, which interprets render instructions. Accordingly, in relation to overlapping object data, overlapping data is sensed and eliminated in edge sorting processing executed in the intermediate data generating unit 203.

Figures 4A, 4B:
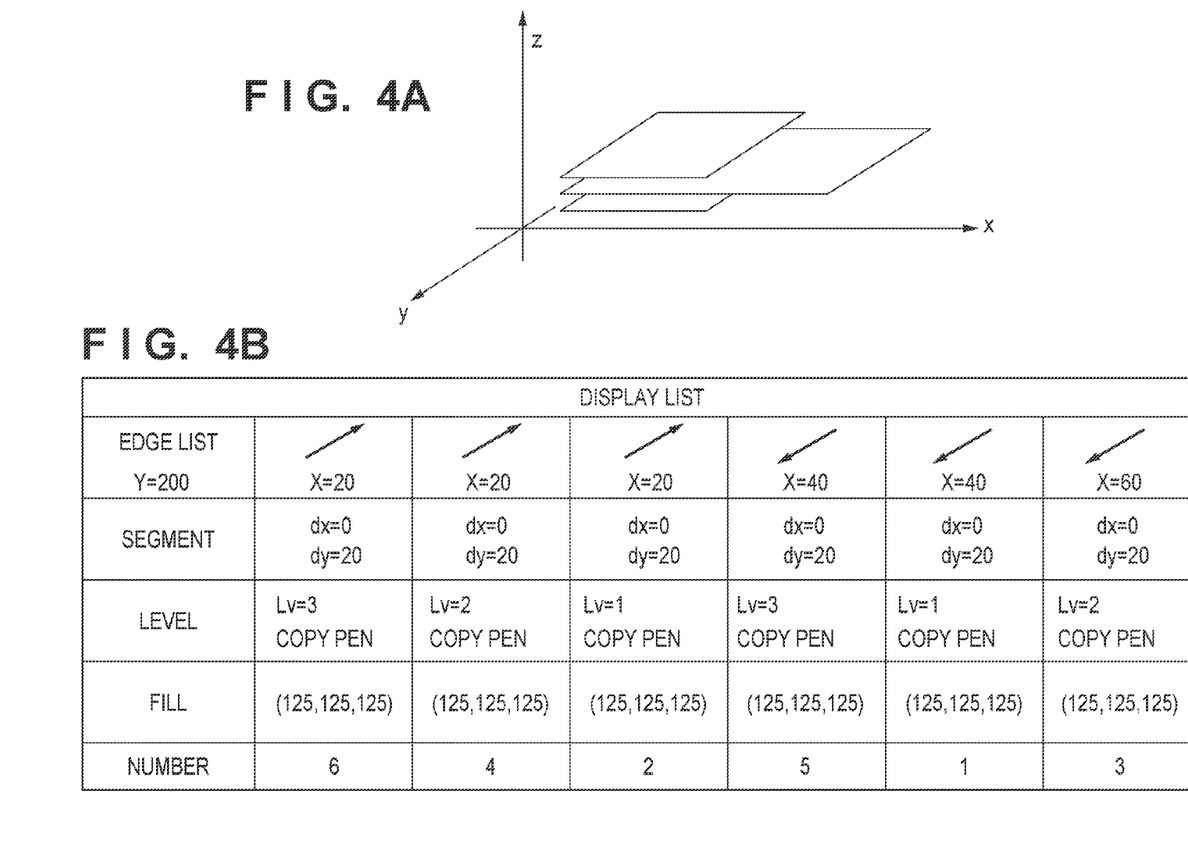

Next, overlaid objects and an example of the constitution of the intermediate data (display list) thereof will be described. FIG. 4A is a schematic diagram in which overlaid objects have been simplified. The overlaid objects are arranged along the Z direction in the order in which rendering instructions have been issued and have X and Y positional coordinates.

FIG. 4B is a diagram illustrating data in which the objects shown in FIG. 4A have been placed in the form of a DL, which is intermediate data, in the intermediate data generating unit 203. The intermediate data (DL) is composed of edges indicating outline information, levels indicating synthesis processing and heights, and fill indicating fill information. Rendering is possible with each of these in a linked state.

After the edge data is generated, sort processing along the X and Y directions is executed. A sorted edge group is expanded in memory as an edge list. The edge data possesses, as segments, point-sequence group information indicated by a starting point and, in addition, direction and amount of displacement from the starting point along the X and Y directions. Thus, by retaining the intermediate data (DL) in the sorted state, it is possible to speed up rendering processing. Further, edges at the same location are made possible by utilizing the data in the sorted state.

Figure 5:
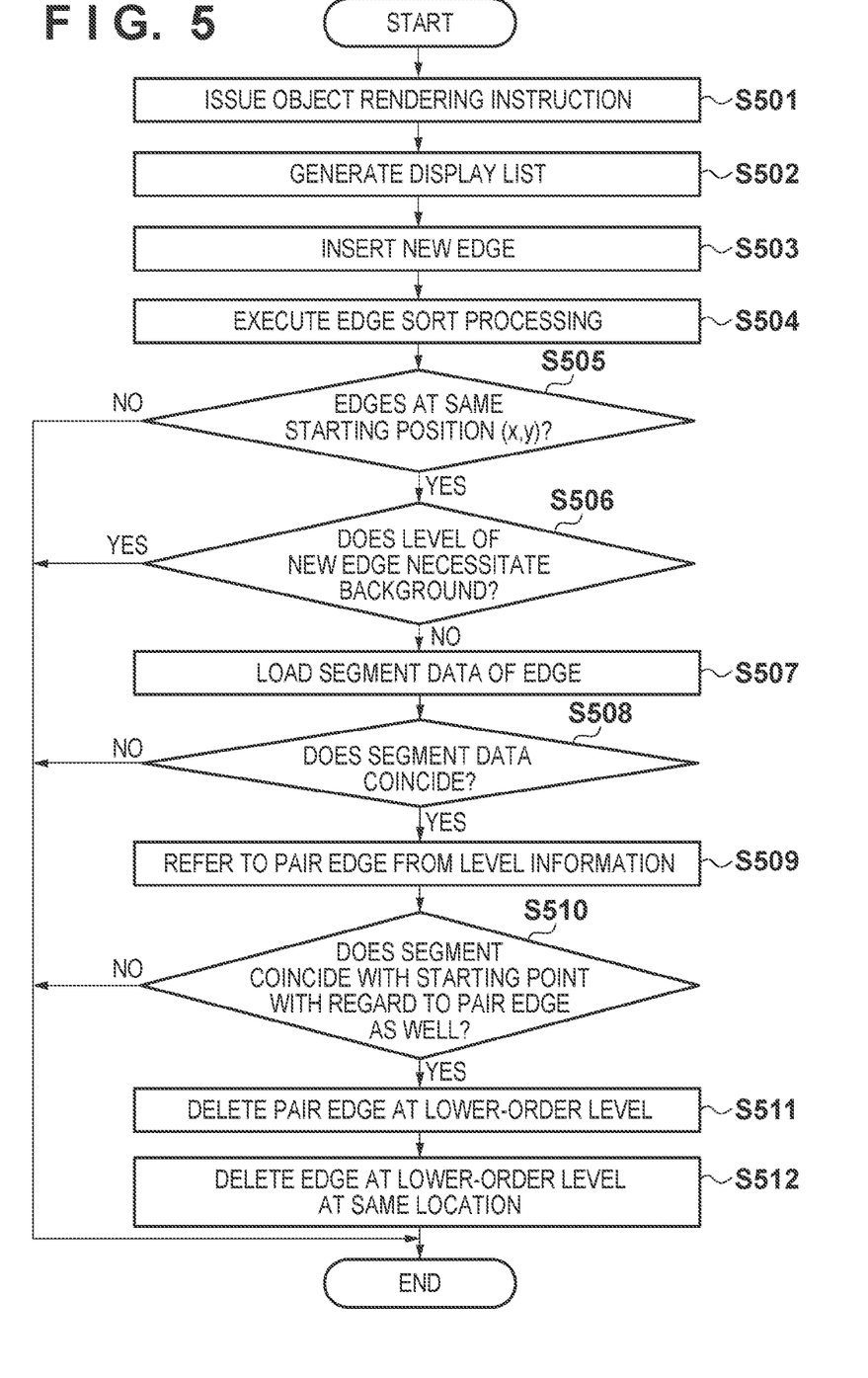
FIG. 5 is a flowchart illustrating processing for deleting combined edges.

Processing for deleting combined edges will now be described with reference to the flowchart shown in FIG. 5. The CPU 112 of image forming apparatus 100 reads PDL data, which has been received from the host computers 191 and 192, to RAM 116. The job control unit 200 receives this PDL data and notifies the PDL interpretation unit 202 of the start of the job. The PDL interpretation unit 202 loads the received data and interprets the rendering instruction at step S501.

Next, the intermediate data generating unit 203 generates a display list at step S502, generates a new edge and inserts it into the edge list at step S503 and subjects the edge-data group to sort processing along the X and Y directions and forms an edge list at step S504.

Next, at step S505, taking the data in the edge list as a target, it is determined whether there are edges at the same starting position as coordinate positions along the X and Y directions. In a case where edges do not exist at the same starting position, overlapping objects do not exist. Processing for generating intermediate data therefore continues.

On the other hand, in a case where the result of the determination at step S505 is that edges exist at the same starting position, overlapping objects exist. Processing therefore proceeds to step S506 and determination processing is continued. At step S506, reference is had to the level information of the new edge and it is determined whether this necessitates background. If the result of the determination is that background is necessary, such as in the case of MERGEPEN in a ROP operation, the result of rendering will no longer be as intended when the background object is deleted. This means that the background object cannot be eliminated. Accordingly, even if an overlapping object exists, it cannot be eliminated and, hence, processing for generating intermediate data is continued. This problem will be discussed in greater detail later.

If the result of the determination in step S506 is that background is unnecessary, such as in the case of COPYPEN in a ROP operation, then it is possible to delete the background object and processing therefore proceeds to step S507. Here the segment data of the edge is loaded. At step S508, a comparison is performed to determine whether the segment data of the edge coincides with regard to the new edge and the edge for which the starting point coincides. If the result of the comparison is that the segment data does not coincide, overlapping objects do not exist and therefore processing for generating intermediate data is continued.

On the other hand, if the result of the comparison at step S508 is that the segment data coincides, an overlapping object exists and, hence, processing proceeds to step S509. Here reference is had to a pair edge from the level information. At step S510, it is determined whether the segment coincides with the starting point with regard to the pair edge as well. A pair edge is an edge group that constitutes a rendering instruction object before edge generation and, in the case of a rectangle, is composed of two edges and is called a "pair edge" for this reason. The leftmost edge shown in FIG. 4B and the fourth edge from the left are a pair edge. Since these coincide in terms of their levels, detection is possible from the level information.

If the result of the determination at step S510 is that the segment does not coincide with the starting point with regard to the pair edges as well, the areas of overlapping objects do not coincide. Consequently, elimination cannot be performed and processing for generating intermediate data is continued.

On the other hand, if the result of the determination at step S510 is that the segment coincides with the starting point with regard to the pair edges as well, then overlapping objects exist. Processing therefore proceeds to step S511 and the pair edge at a lower-order level is deleted. Then, at step S512, the edge at the lower-order level at the same location is deleted and processing for deleting combined edges is terminated.

A case where the processing shown in FIG. 5 described above has been implemented with regard to the display list shown in FIG. 4B will now be described. Assume that when the edge at No. 6 has been registered in the edge list anew, the state at this time is one in which Nos. 1 to 5 have already been registered in the edge list. The edge (the edge at No. 4) whose starting point coincides with the edge of No. 6 is sensed first.

Since the level of the No. 6 edge is COPYPEN, elimination of the background object is possible. The No. 6 edge and the No. 4 edge coincide in terms of their segment data as well. The pair edge of the No. 6 edge is the No. 5 edge of the same level Lv=3, and pair edge of the No. 4 edge is the No. 3 edge of the same level Lv=2. When reference is had to the edge list, it is found that the No. 5 edge and the No. 3 edge do not coincide in terms of the X coordinate position of the starting point. This means that elimination cannot be performed. Accordingly, it is determined that elimination is not possible.

On the other hand, since the No. 6 edge and the No. 2 edge are the same inclusive even of the pair edge, elimination is possible. The lower-order No. 2 edge and the No. 1 edge, which is the pair edge thereof, are eliminated.

Figure 6:
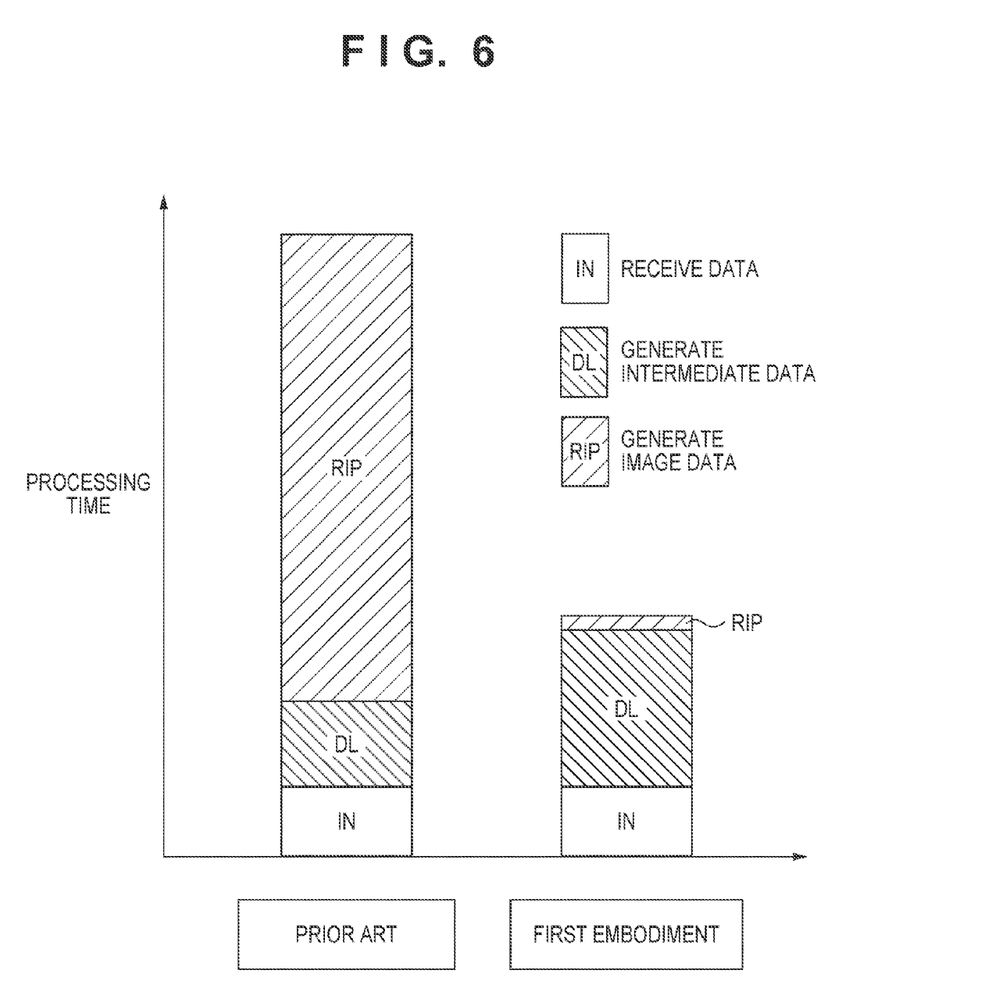
FIG. 6 is a schematic diagram for describing the effects of deleting combined edges.

FIG. 6 is a schematic diagram for describing the effect of combined-edge deletion in the first embodiment. In a case where conventional scan-line rendering processing has been executed, 879 objects overlap at a time in the overlaid objects as shown in FIG. 3A. Consequently, image data generation processing takes time and more than two minutes are required even in an arrangement in which the image data generating unit 205 is implemented by hardware.

By contrast, with the first embodiment, the intermediate data (DL) generation time is a lengthy 15 seconds since it is necessary to detect and erase overlapping edge data. However, since rendering is carried out in a state in which overlapping data has been deleted, the time needed for image data generation processing is shortened greatly from more than two minutes to four seconds.

In accordance with the first embodiment, the number of rendered objects can be reduced by eliminating unnecessary overlapping edges, and it is possible to achieve high-speed rendering of data in which objects, namely graphics and lines, overlap.

[Second Embodiment]

Next, a second embodiment according to the present invention will be described in detail with reference to the drawings. In the second embodiment, deletion of combined edges and deletion of object level is carried out with respect to overlapping objects. It should be noted that the hardware and software configurations of the image forming apparatus in the second embodiment are similar to those of the first embodiment and need not be described again.

Figure 7:
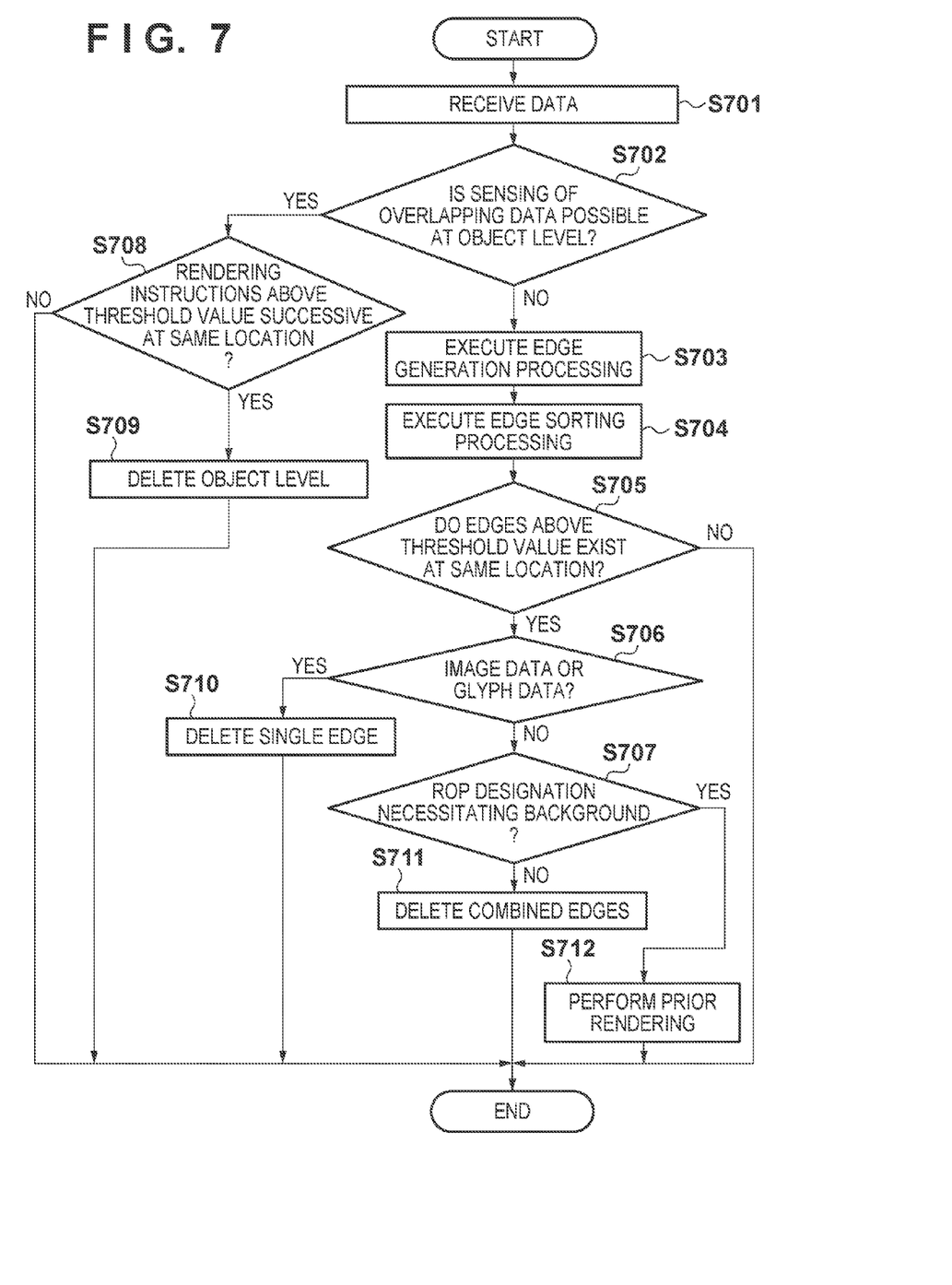
FIG. 7 is a flowchart illustrating deletion processing according to a second embodiment of the present invention.

FIG. 7 is a flowchart illustrating deletion processing according to the second embodiment. The CPU 112 of image forming apparatus 100 writes PDL data, which has been received from the host computers 191 and 192, to RAM 116. The job control unit 200 receives this PDL data and notifies the PDL interpretation unit 202 of the start of the job. The PDL interpretation unit 202 loads the received data at step S701.

Next, at step S702, the PDL interpretation unit 202 interprets the received PDL data and determines whether it is possible to sense, at the object level, whether overlapping data is successive in the render instruction of this PDL data. If the result of the determination is that sensing of the overlapping data is possible at the object level, processing proceeds to step S708 and the PDL interpretation unit 202 determines whether rendering instructions above a threshold value are successive at the same location. If the result of the determination is that rendering instructions above the threshold value are successive at the same location, processing proceeds to step S709 and object-level deletion is carried out. In this object-level deletion, overlapping objects placed at the same location are deleted in units of the rendering instructions. The details will be described in greater detail later with reference to FIG. 8A.

On the other hand, if the result of step S708 is a determination that rendering instructions above the threshold value are not successive at the same location, then there is no need to delete overlapping objects and processing is exited as a result. The threshold value is a value decided by the number of edges and number of levels capable of being cached in rendering processing.

If the result of the determination at step S702 is that sensing of overlapping data is not possible at the object level, then processing proceeds to step S703 and processing for generating edges of a display list is executed. At step S704, the generated edge data is subjected to sort processing along the X and Y directions. Next, at step S705, whether edges above a threshold value exist at the same location is determined utilizing the edge-sorted state. If the result of the determination is that edges above the threshold value do not exist at the same location, then there is no need to delete overlapping objects and processing is exited as a result.

On the other hand, if it is determined at step S705 that edges above the threshold value exist at the same location, then processing proceeds to step S706. Here it is determined whether fill data to which the edge data of interest is referring is image data or glyph data. If it is determined that the fill data is image data or glyph data, processing proceeds to step S710, single-edge deletion is selected and processing is executed. In single-edge deletion, an overlapping object is composed only of a single edge and therefore this one edge is deleted. The details will be described in greater detail later with reference to FIG. 8B.

On the other hand, if it is determined at step S706 that the fill data is not image data or glyph data, then processing proceeds to step S707 and it is determined whether the fill data is a ROP designation necessitating background. If it is determined that the fill data is not a ROP designation necessitating background, processing proceeds to step S711 and deletion of combined edges described in the first embodiment is carried out.

If it is determined at step S707 that the fill data is a ROP designation necessitating background, a lower-order object cannot be deleted. As a consequence, processing proceeds to step S712 and prior rendering is utilized. The details will be described in greater detail later with reference to FIG. 8C.

Figure 8A:
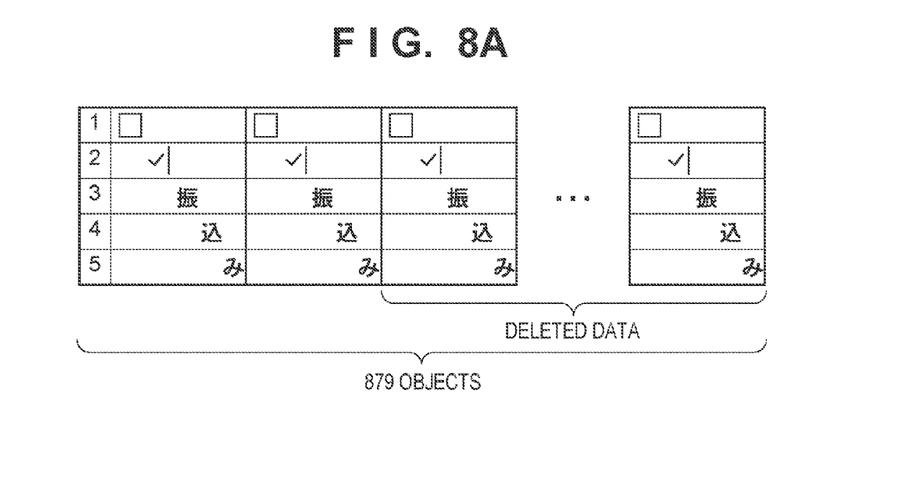
FIG. 8A is a schematic diagram illustrating deletion at an object level and FIG. 8B a schematic diagram illustrating deletion at a single edge.
Figure 8B:
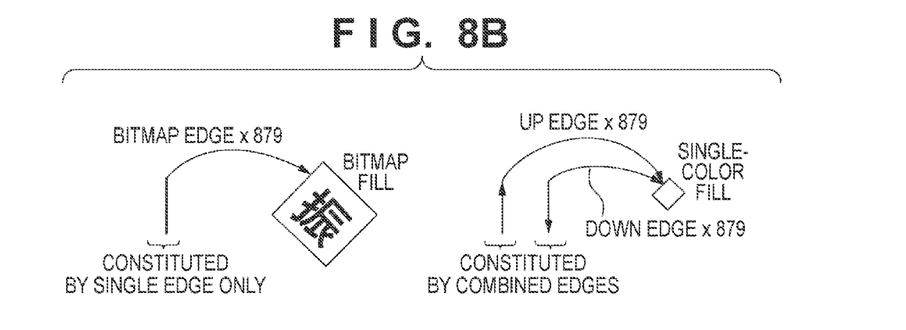
Figure 8C:
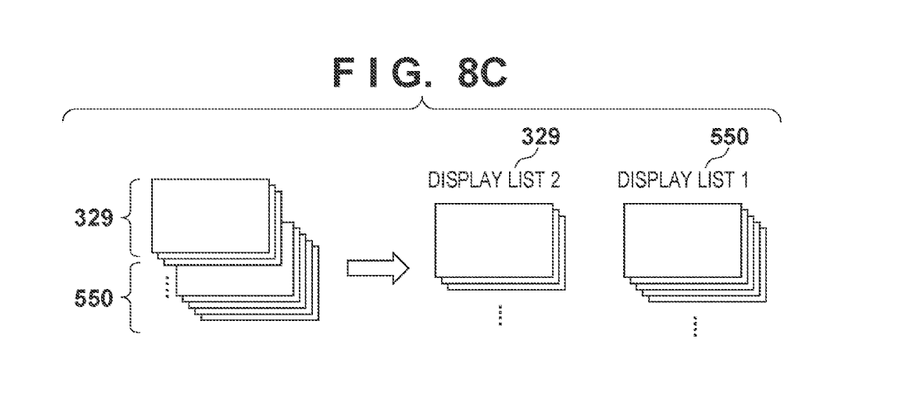
FIG. 8C is a schematic diagram in a case where prior rendering is performed.

FIGS. 8A to 8C are schematic diagrams illustrating object deletion, single-edge deletion and prior fallback. FIG. 8A is a schematic diagram illustrating deletion of an object level. In a case where an object indicating a single □ is successive 879 times as a rendering instruction, overlap determination is possible by referring to objects on both sides and deletion is performed from objects along the way.

FIG. 8B is a schematic diagram illustrating deletion at a single edge. Here character data is constituted by a bitmap edge that expresses an edge by binary image data, and it is composed of only a single edge. Such an edge differs from a vector edge having up and down directions in the manner of a graphic or line. Since it is constituted by a single edge, it will suffice to sense and detect one edge.

FIG. 8C is a schematic diagram for a case where prior rendering is performed. For example, in a case where there is designation of an α blend or a case where it is necessary to refer to the value of background in an ROP operation, objects cannot be deleted even if a plurality of objects overlap. Accordingly, at the moment a threshold value (assumed to be 550 in this example) at which rendering processing slows down is exceeded, the display list is closed and rendering processing is started first.

Thus, in accordance with the second embodiment, rendering processing can be speeded up by dividing rendering into rendering performed two times.

[Third Embodiment]

Next, a third embodiment according to the present invention will be described in detail with reference to the drawings. In the third embodiment, a case where edge data is deleted in rendering processing will be described. It should be noted that the hardware and software configurations of the image forming apparatus in the third embodiment are similar to those of the first embodiment and need not be described again.

Figure 9:
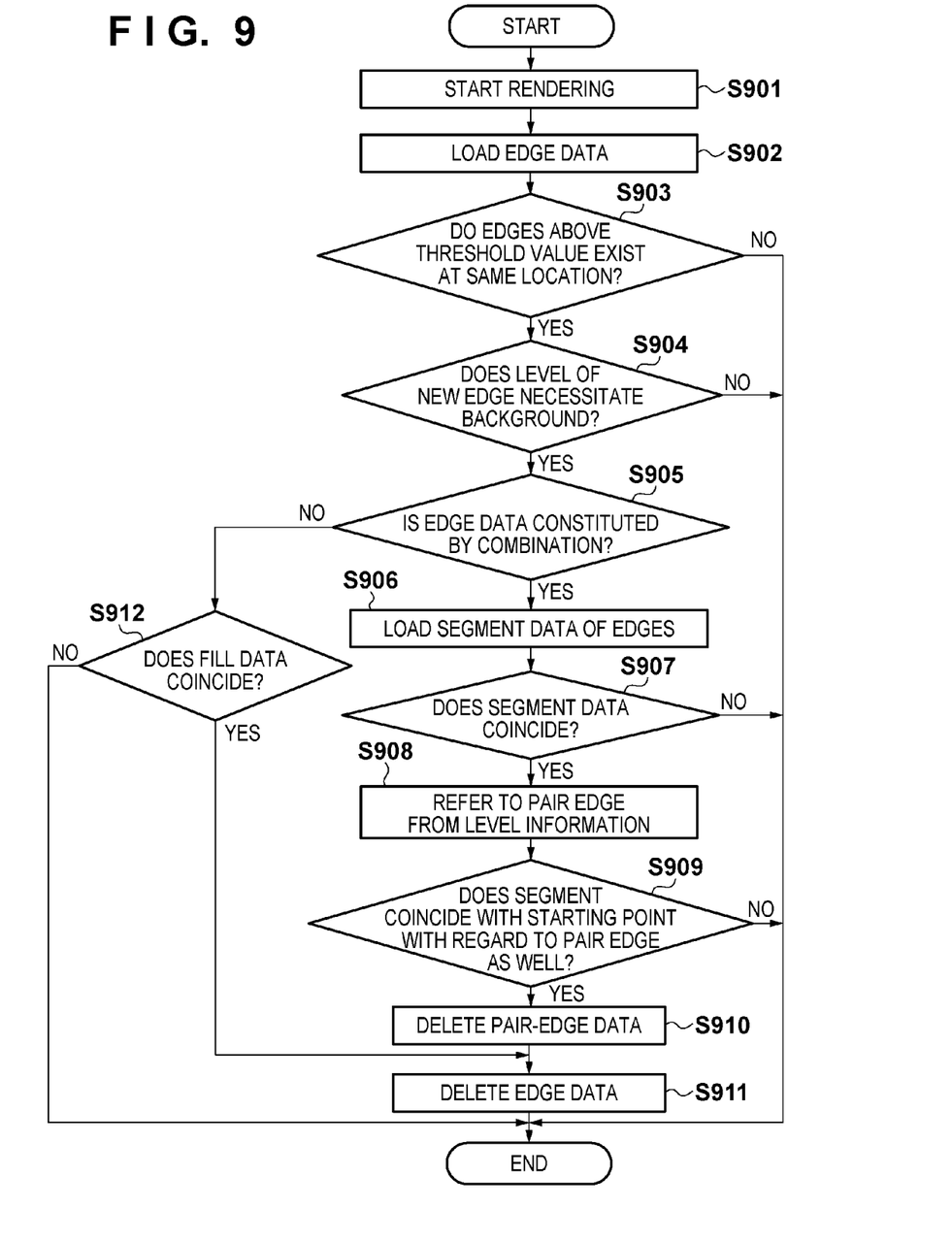
FIG. 9 is a flowchart illustrating processing for deleting an edge during rendering.

FIG. 9 is a flowchart illustrating processing for deleting edges during rendering. In the first embodiment, combined-edge deletion processing is executed during the generation of intermediate data (a display list). In the example shown in FIG. 9, if edge overlap detection cannot be performed and combined-edge deletion processing cannot be carried out during the generation of intermediate data (a display list), then it is implemented in rendering processing, which is post-processing.

The image data generating unit 205 in the image forming apparatus 100 sorts the display list that has been generated by the intermediate data generating unit 203 and starts rendering at step S901. Next, the edge data is loaded at step S902 and it is determined at step S903 whether edges above a threshold value exist at the same starting position. If the result of the determination is that edges above the threshold value do not exist at the same location, then there is no need to delete overlapping edges and processing is exited as a result.

On the other hand, if it is determined at step S903 that edges above the threshold value exist at the same location, then processing proceeds to step S904. Here it is determined whether the level of a new edge necessitates background. If the result of the determination is that the level of a new edge necessitates background, then overlapping edges cannot be eliminated. Processing is therefore exited.

If it is determined at step S904 that the level of a new edge does not necessitate background, processing proceeds to step S905 and it is determined whether the edge data is constituted by a combination. If the edge data is constituted by a combination, processing proceeds to step S912 and it is determined whether fill data coincides. If the result of the determination is that the fill data coincides, then the edge is an edge constituted by only a single item of data. Processing therefore proceeds to step S911 and the edge data is deleted.

On the other hand, if it is determined at step S905 that the edge data is constituted by a combination, processing proceeds to step S906 and segment data of both edges whose starting points coincide is loaded. It is then determined at step S907 whether the segment data coincides. If it is determined that the segment data does not coincide, then the edge data cannot be eliminated and this series of processing steps ends.

If it is determined at step S907 that the segment data coincides, then processing proceeds to step S910 and the pair-edge data is deleted. Then, at step S911, the edge data is deleted and processing for deleting edges during a series of rendering operations is terminated.

Figure 10A:
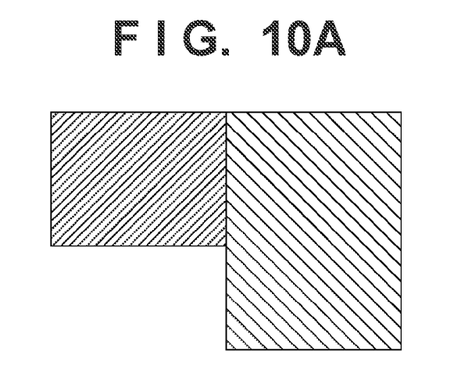
FIG. 10A is a flowchart illustrating processing for deleting an edge during rendering and FIG. 10B a schematic diagram in which rendering processing has been executed.
Figure 10B:
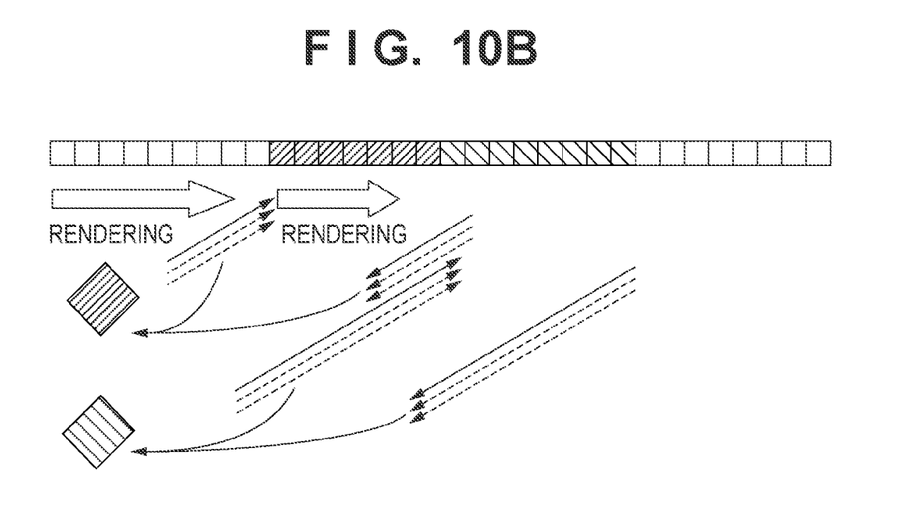

FIG. 10A is an example of processing for deleting an edge during rendering. Graphic data shown in gray on the left side and graphic data shown in gray on the right side are the result of overlapping and rendering three each of the same object. FIG. 10B a schematic diagram in which FIG. 10A has been subjected to rendering processing by the image data generating unit 205. Thus, scan line rendering is processing for loading an edge every identical scanning line along the Y direction and executing pixel rendering.

First, the left-side edges of the gray objects are loaded. Since three edges are overlapping at this time, the two lower-order edges and the two pair edges on the right side thereof are deleted (see the broken-line arrows). Next, processing on the scanning line is advanced to the right and an edge is detected. Next, at the location where the edge exists, four edges exist in overlapping form since two edges have already been eliminated. From among these four edges, it is possible to eliminate a further two. Therefore, these also are eliminated, inclusive of the pair edges, by the third embodiment.

In accordance with the third embodiment, high speed image processing is made possible by eliminating overlapping edges in rendering processing.

[Other Embodiments]

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-137739, filed Jun. 21, 2011, which is hereby incorporated by reference herein in its entirety.

What is claimed is:

1. An image processing apparatus for subjecting objects to rendering processing, comprising:
    a generation unit configured to generate a first display list of a first object and a second display list of a second object from a first rendering instruction of the first object and a second rendering instruction of the second object respectively, the first display list and the second display list including a first pair of an up-edge and a down-edge of the first object and a second pair of an up-edge and a down-edge of the second object respectively;

a determination unit configured to determine whether the first pair included in the first display list coincides with the second pair included in the second display list, by comparing the up-edge and the down-edge of the first object to the up-edge and the down-edge of the second object respectively; and a deletion unit configured to delete the pair of the up-edge and the down-edge of the second object in a case where the determination unit has determined that the pairs coincide with each other.

2. The apparatus according to claim 1, wherein, for each pair of an up-edge and a down-edge included in each display list of an object, the edges are associated with level information in regard to whether or not a background object is required for rendering the object and fill information in regard to a color of the object.

3. The apparatus according to claim 2, wherein the determination unit further determines whether the pairs coincide with each other by referring to the level information of each pair of edges included in each display list of an object, the level information regarding to whether or not a background object is required for rendering the object.

4. The apparatus according to claim 1, wherein the determination unit determines whether rendering instructions each representing a single object are successive in excess of a threshold value at the same starting position where the objects are overlaid by the rendering instructions; and in a case where the determination unit has determined that the rendering instructions are successive in excess of the threshold value at the same starting position, the deletion unit deletes the successive render instructions.

5. The apparatus according to claim 1, wherein a graphics object has a pair of an up-edge and down-edge in vector form, a bitmap character object has a bitmap edge which represents an edge of the character object by binary bitmap image, wherein the determination unit and the deletion unit act if the object is a graphics object, and wherein the determination unit and the deletion unit do not act if the object is a bitmap character object.

6. The apparatus according to claim 1, wherein the comparing by the determination unit configured to includes (i) determining whether a length and a direction of the up-edge of the first object are the same as a length and a direction of the up-edge of the second object respectively and (ii) determining whether a length and a direction of the down-edge of the first object are the same as a length and a direction of the down-edge of the second object respectively, wherein an up-edge and a down-edge correspond to a starting position and an ending position of an object respectively; and wherein the determination unit determines the pair coincide with each other in a case where it has been determined that the length and the direction of the up-edge of the first object are the same as the second object and the length and the direction of the down-edge of the first object are the same as the second object. a background object is required for rendering the object.

7. The apparatus according to claim 1, wherein a display list of a graphics object includes a pair of an up-edge and a down-edge; and wherein the determination unit performs the determination on plural display lists of plural graphics objects.

8. An image processing method executed by an image processing apparatus for subjecting objects to rendering processing, comprising:

generating a first display list of a first object and a second display list of a second object from a first rendering instruction of the first object and a second rendering instruction of the second object respectively, the first display list and the second display list including a first pair of an up-edge and a down-edge of the first object and a second pair of an up-edge and a down-edge of the second object respectively;

determining whether the first pair included in the first display list coincides with the second pair included in the second display list, by comparing the up-edge and the down-edge of the first object to the up-edge and the down-edge of the second object respectively; and deleting the pair of the up-edge and the down-edge of the second object in a case where the determination has determined that the pairs coincide with each other.

9. A non-transitory computer-readable recording medium storing a program for causing a computer to execute the image processing method set forth in claim 8.

* * * * *